United States Patent [19]

Greenheck et al.

[11] Patent Number: 4,527,400
[45] Date of Patent: Jul. 9, 1985

[54] AIR SHUTTER ARRANGEMENT FOR TRANSPORT REFRIGERATION UNIT

[75] Inventors: Donald W. Greenheck, Shoreview; Lowell M. Anderson, Bloomington, both of Minn.

[73] Assignee: Westinghouse Electric Corp., Pittsburgh, Pa.

[21] Appl. No.: 171,601

[22] Filed: Jul. 23, 1980

[51] Int. Cl.³ .............................................. B60H 3/04
[52] U.S. Cl. ...................................... 62/239; 62/243; 62/263; 62/428; 62/507
[58] Field of Search ................. 62/239, 243, 244, 262, 62/263, 428, 507; 98/2.11

[56] References Cited

U.S. PATENT DOCUMENTS

| | | | |
|---|---|---|---|
| 2,513,679 | 7/1950 | Ritter | 62/239 X |
| 2,525,868 | 10/1950 | Corhanidis | 62/263 |
| 2,696,084 | 12/1954 | Kirkpatrick | 62/243 X |
| 3,100,384 | 8/1963 | Lowensohn | 62/243 X |

Primary Examiner—Lloyd L. King
Attorney, Agent, or Firm—E. C. Arenz

[57] ABSTRACT

In a transport refrigeration unit, top and front shutters are controlled to open in sequence upon rising temperatures being sensed by temperature responsive control means located in a recirculation passage between the shutters.

7 Claims, 5 Drawing Figures

AIR SHUTTER ARRANGEMENT FOR TRANSPORT REFRIGERATION UNIT

BACKGROUND OF THE INVENTION

1. Field of the Invention:

This invention pertains to the art of transport refrigeration units, and in particular to an airflow control arrangement for a unit provided with air shutters at its front and top to control the airflow through the refrigerant condenser and the radiator for the internal combustion engine of the unit.

2. Description of the Prior Art:

Transport refrigeration units of the type with which this invention is concerned are designed to provide as controlled temperature in the conditioned space, such as in a truck trailer or a railway car, which may be as low as −20° F. (−29° C.) or as high as 70° F.(21° C.), depending upon the particular food cargo to be transported. These temperatures are to be obtained even though the ambient temperature may be as high as that of the desert, or as low as that found in the north during severe cold waves. As a result, the transport refrigeration units are designed to be quite versatile in operation and provide heating and cooling at various capacity rates.

One arrangement which has been considered to be helpful with respect to a heating operation and wherein the heating capability is increased at low ambient temperatures is the provision of shutters in the openings in the external cabinet through which condenser and radiator cooling air is passed. To the best of our knowledge such shutters have heretofore comprised a slotted stationary plate and a slotted slidable plate operated automatically by one or more thermal motors which will move both shutters toward open or closed position simultaneously in response to given increasing and decreasing temperatures respectively, in the interior of the cabinet. Such an arrangement has functioned satisfactorily for some purposes, but there have also been problems with such an arrangement which this invention is intended to solve. As noted before the units are expected to function to produce some given interior temperature irrespective of significant variations in the ambient temperature. One difficulty which has been experienced with the prior shutter arrangement is that under some such conditions the compressor discharge pressures rise to a level so quickly after the unit has been started that the unit automatically shuts down. Thus, it has been experienced that with ambient temperatures even in a mid-range such as 55° to 75° F. (13° to 24° C.) and with the sliding shutters control set as say, 85° F. (29° C.), when a number of units are tobe started as in a railroad yard, some units will have the shutters open soon enough that the unit does not shut down while other units will reach an excessive discharge pressure and automatically shut down. At higher ambient temperatures the likelihood is that even more units will automatically shut down from the high discharge pressure. One solution to this latter problem is to have the shutters open at a lower set point temperature such as 75° F. (24° C.), and while this has been effective to avoid most shutdowns, it also means that when increased capacity for heating is desired it will be lost at an earlier time than is desired because of the earlier opening of the shutters.

The slotted plate shutter arrangement also created some problems in that it restricts airflow beyond that of an ordinary grille, an accordingly under conditions of very high ambient temperatures, and with a significant load on the unit, the airflow may not be adequate to avoid a compressor shutdown because of the high compressor discharge temperatures.

It is the aim of this invention to provide an airflow control arrangement with shutters in which the above-noted difficulties of the prior art are significantly reduced.

SUMMRY OF THE INVENTION

In accordance with the invention in its preferred form, a transport refrigeration unit of the type noted which has a refrigerant condenser and a cooling radiator for the prime mover, located in the cabinet space external of the space being conditioned, and has an upper front opening forward of the condenser and radiator, and a top opening, with fan means for moving air through the condenser and the radiator, is provided with a front shutter means in the front opening and a top shutter means in the top opening, and has means for controlling the opening of the top and the front shutter means independently and in respone to temperatures sensed within the cabinet. The controlling means is operative to initiate opening of the top shutter means at a sensed temperature less than the temperature at which the opening of the front shutter is initiated, the controlling means moving the top shutter from closed to open in response to the sensed temperature rising within a first temperature range and operating the front shutter from closed to open position in response to the sensed temperature rising within a second temperature range greater than the first temperature range. As currently preferred, the two temperature ranges overlap.

Each of the shutters comprise a series of motor blades on horizontal axes with the blades in imbricated relation with the shutters closed, and with the imbricated relation being such that the upper surfaces of the blades of the upper shutter face forwardly upon opening, and the front surfaces of the blades of the front shutter face upwardly upon opening.

The temperature responsive control means is located in what is herein called a recirculation passage in the upper front corner of the cabinet and in communication at its rear with the space below the upper shutter and in communication at its bottom with the space behind the upper portion of the front shutter.

DESCRIPTION OF THE PREFERRED EMBODIMENT

Figure 1:
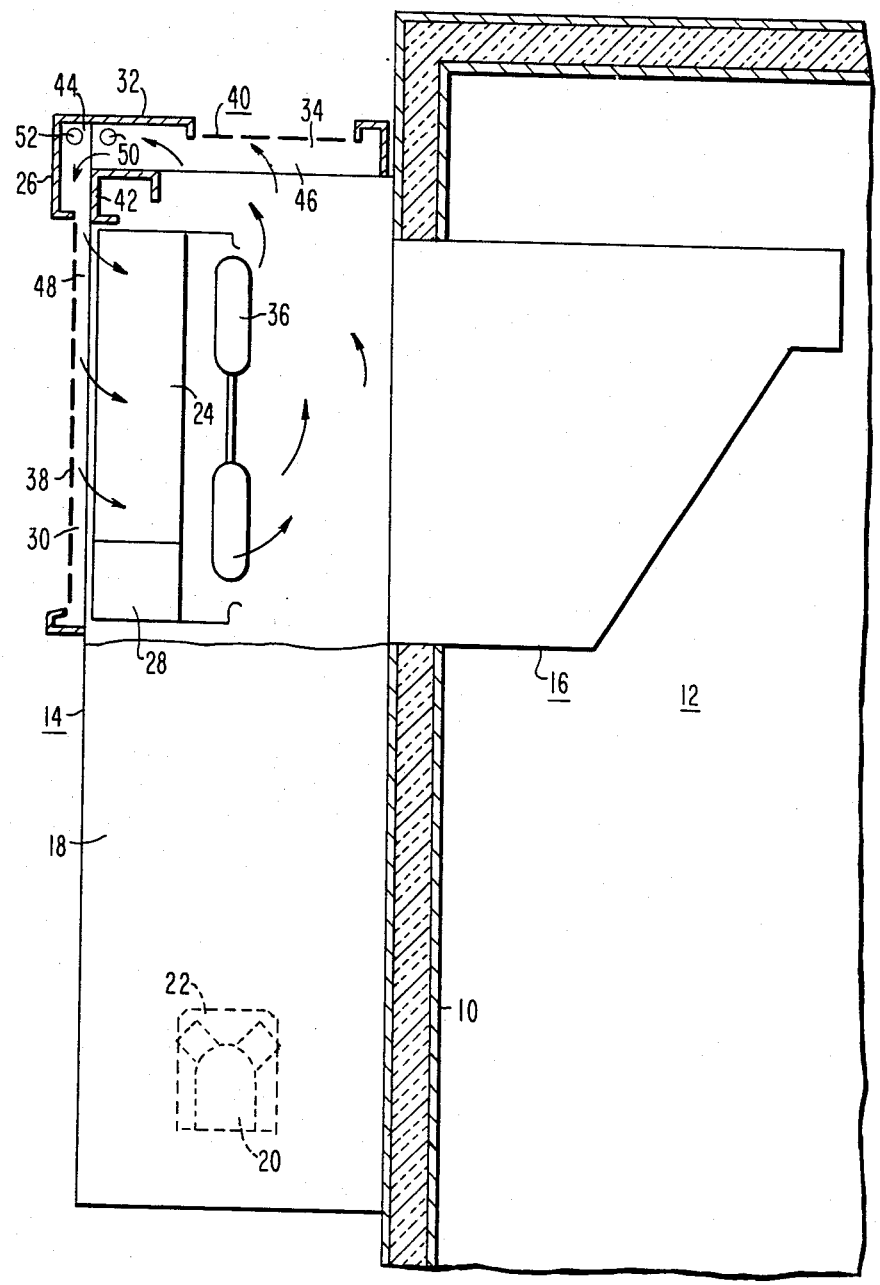
FIG. 1 is a somewhat schematic side view of a refrigeration unit having arrangement according to the invention and mounted upon a vehicle to be served.

The transport refrigeration unit of FIG. 1 is shown mounted to the front wall of the container 10 which may be a truck trailer or railroad car for example, the interior space 12 of which is to be conditioned by the unit. The unit basically comprises the external part generally designated 14 and an interior part generally designated 16 which projects into the space 12 and which receives air from that space, conditions it and returns it to the space.

The cabinet 18 of the external part contains a refrigerant compressor 20 and an internal combustion engine prime mover 2 which drives the compressor, as well as other devices, when the engine is being used. It will be appreciated that as is conventional in this art the refrigeration unit may also include an electric alternator-motor which at times may be used to power the refrigeration unit in lieu of the engine 22.

The upper part of the cabinet 18 contains a heat exchanger coil 24 which functions as a refrigerant condenser when the unit is operating in a cooling mode and will hereinafter be so called. The condenser is vertically disposed, and located near the front wall 26 of the cabinet. Immediately below the condenser is the cooling radiator 28 for the engine 22. Both the condenser and radiator present their upstream faces (with respect to the direction of airflow) to a front opening 30 in the front wall 26.

The top wall 32 of the cabinet has a top opening 34 therein, this opening being located toward the rear of the top wall. The top portion of the cabinet also includes a fan 36 adapted to draw air through the condenser 24 and radiator 28 and either recirculate it as indicated by the arrows in FIG. 1, or discharge it in whole or part as indicated by the arrows in FIGS. 2 and 3. The fan 36 may be driven by either an electric motor or by a system of pulleys and belts, both being conventional in the art and accordingly, neither arrangement shown.

Figure 2:
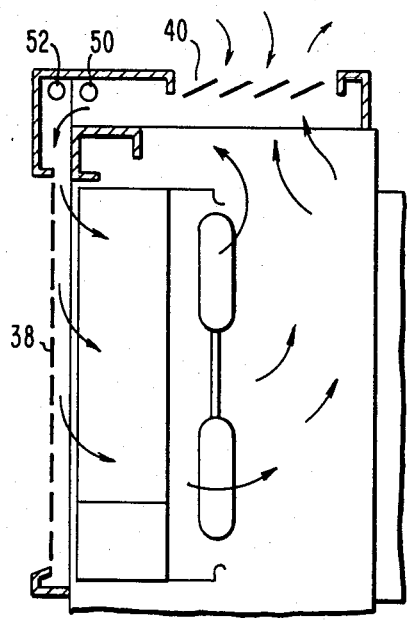
FIG. 2 is another schematic view of the upper part of the unit with the top air shutter in a partly open position.
Figure 3:
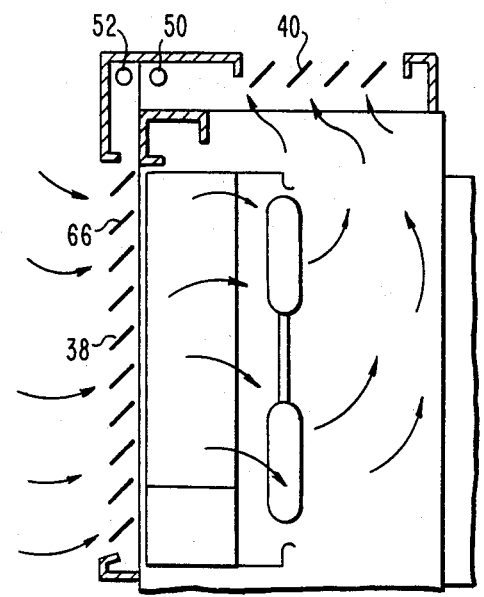
FIG. 3 is a view as in FIG. 2 with both the front and top shutters open.
Figure 5:
FIG. 5 is a cross-sectional view corresponding to one taken along the line V—V of FIG. 4 and showing the imbricated relation of the shutter blades in the closed position.
Figure 4:
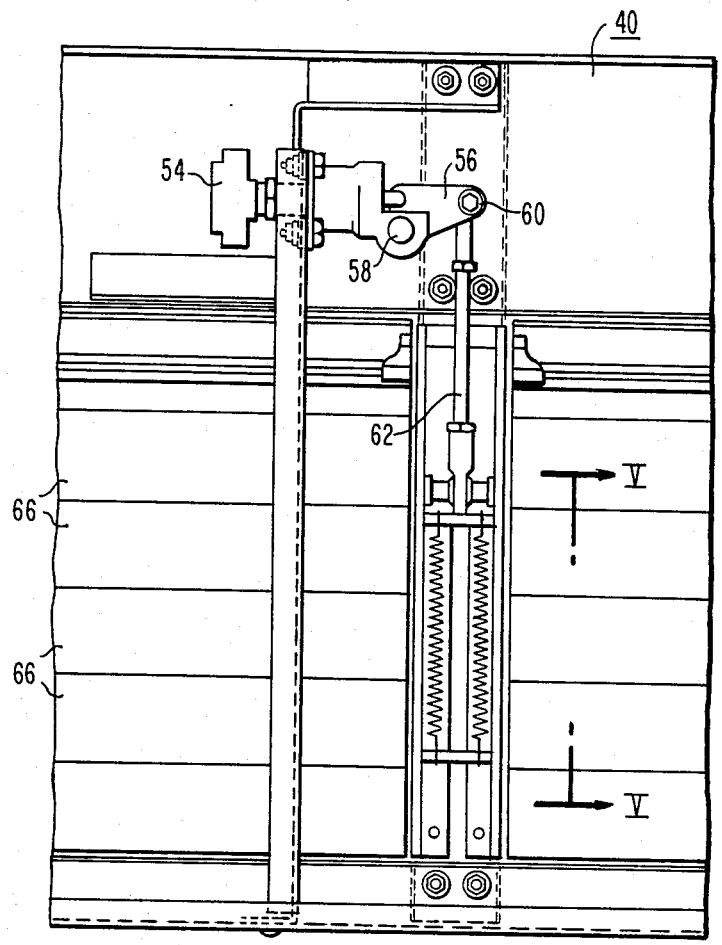
FIG. 4 is a fragmentary view in which a shutter operating mechanism and a part of the top shutter are shown.

The front opening 30 is provided with a louvered shutter 38 and the top opening 34 is provided with a larger similar louvered shutter 40, both being shown in somewhat schematic form in FIGS. 1–3 for purposes of explaining the invention, and shown in true form in FIGS. 4 and 5.

Near the upper front corner of the cabinet, a structural member 42 functions as a partition so that a passageway 44 is formed which extends from a first location adjacent to the space 46 below the front part of the upper shutter 40 to a second location 48 adjacent the space behind the upper part of the front shutter 38. This passageway is termed a recirculation passageway since when it functions it functions for the most part to that effect. As shown by the directional arrows in FIG. 1, when both shutters are closed substantially all of the air being moved by the fan 36 does recirculate through that passageway 44.

As shown in FIGS. 1–3 in a schematic way, the passageway contains a first temperature responsive control element 50 and a second temperature responsive control element 52, the first element controlling the opening of the top shutter 40 and the second controlling the opening of the front shutter 38.

Referring to FIG. 4, the specific arrangement of the control means for the top shutter is shown along with the central portion of the top shutter. The control means includes a power element in the form of a conventional thermal motor 54 which, upon an increasing temperature in the range to which the control is set will push a rod pivotally connected to the lever 56 which in turn is pivoted on pin 58. The end of the lever 60 farthest from the pin 58 is pivotally connected to adjustable rod 62 which in turn is connected to the movable member 64 which gangs the individual louver blades 66 together for simultaneous pivoting. The blades 66 are shown in closed position in FIG. 4 and FIG. 5, and it will be seen that in the closed position the individual blades lie in imbricated relation with each other. This imbricated relation of the blades with each other in the closed position of the shutter also obtains with the front shutter which is not shown in detail herein since the form of the shutter and the control means is substantially the same as that for the top shutter shown in FIG. 4. As is common with such louvered shutters, the shutters are biased to a closed position and forced to increasingly open positions with an increasing temperature in the particular range to which the control element is set.

OPERATION

In the currently preferred mode of operation the control element 50 which exercises control of the top shutter is set to begin opening the shutter at 78° F. (26° C.) and to increasingly open the shutter as the temperature rises until, at 93° F. (34° C.), the top shutter is totally open.

The control element 52 which exercises control over the front shutter is set to begin opening the front shutter at 85° F. (29° C.) with an increase in temperature and to increasingly open the front shutter until, at 100° F. (38° C.), the front shutter is totally open.

Thus, it will be apparent that the shutters are independently controlled for operation in a first and a second temperature range.

With the temperature of the air being circulated as indicated by the directional arrows in FIG. 1 being below 78° F. (26° C.), both shutters are fully closed and a simple recirculation path exists. This is especially useful for increasing the heating capacity of the unit in cold ambient temperatures. This recirculation, of course, provides for raising the air temperature within the path above the ambient temperature, and minimizes heat loss from refrigerant components and from the engine.

Referring now to FIG. 2 as the temperature of the air passing through the recirculation passage 44 increases to about 78° F. (26° C.), the control element in response to this temperature will begin opening of the top shutter 40 and it will have reached a partly open position as shown in FIG. 2 by the time the temperature passing by the control elements reaches 85° F. (29° C.). As the top shutter opens it permits both the discharge of some of the warmed air in the cabinet as well as permitting the entrance of some of the outside air toward the front of the shutter by virtue of this space being on the suction side of the recirculation passageway. Depending on the proportion of outside air admitted and warm air discharged and the heating of the air being recirculated the top shutter will modulate one way or another so long as it is within the noted temperature range in which the control element acts.

If the temperature rises above 85° F. (29° C.), the control element 52 will begin to open the front shutter while the top shutter opens increasingly as the temperature rises up to 93° F. (34° C.) at which it is fully open.

The condition of both the front shutter 38 and the top shutter 40 being fully open is shown in FIG. 3 with the flow being as indicated by the directional arrows and in which all of the entering air is discharged from the top shutter. In that connection the disposition of the top blade 66 of the front shutter relative to the outlet end of the recirculation passageway is such that upon the front shutter being fully open the recirculation passage is materially obstructed by the blade.

It will be seen in FIG. 3 that the orientation of the louver blades of the shutters 38 and 40 are such that the front surfaces of the blades of the fron shutter face upwardly upon opening of the front shutter 38, and that the upper surfaces of the blades of the upper shutter 40 face forwardly upon opening of the upper shutter. With this disposition of the blades of the upper shutter it will be appreciated that a suction condition exists externally of the top shutter when the vehicle is in motion which will aid in increasing the flow of air through the cabinet. Also, while any shutter arrangement will increase air flow resistance through an opening as contrasted to a bare opening, the louvered shutter arrangement, as distinct from a sliding plate shutter arrangement results in an increased airflow when the louvers are wide open as contrasted to a wide open position of the slotted shutter plates of the prior art. In the preferrred form the blades are of air foil shape in cross section as seen in FIG. 5, and this has been found to be advantageous in that when the shutters are open the airflow characteristics are improved sufficiently that up to 20% more air is admitted for cooling as compared to the prior fixed grille.

It is noted that when the ambient temperature is relatively low and a heating operation is dictated for a particular internal temperature of the container, the addition of the cooler ambient air entering the front part of the top shutter and mixing with air being recirculated through the recirculation passage tends to keep the top shutter from opening to a greater extent than if this ambient air were not recirculated, and accordingly, will aid in increasing the heating capacity of the unit. Additionally, and also important, is that the front shutter tends to remain closed which permits the engine (usually a diesel) to run warmer for overall better operation.

We claim:

1. In a transport refrigeration unit of the type having an internal combustion prime mover and including a cabinet external of the space being conditioned, and having a refrigerant condenser and a cooling radiator for said prime mover in the upper portion of said cabinet along with a fan for moving air through said condenser and radiator, the cabinet having a front opening and top opening, an airflow control arrangement comprising:
   front shutter means in said front opening;
   top shutter means in said top opening;
   means for controlling the opening of said top and said front shutter means independently of each other and in response to temperature sensed within said cabinet, said controlling means being operative to initiate opening of said top shutter means upon a rising sensed temperature less than the temperature at which opening of said front shutter means is initiated.

2. In a arrangement according to claim 1 wherein:
   said controlling means includes means for operating said top shutter means from closed to open in response to said sensed temperature rising within a first temperature range and for operating said front shutter means from closed to open in response to said sensed temperature rising within a second temperature range greater than said first temperature range.

3. In an arrangement according to claim 2 wherein:
   said first and second temperature ranges overlap.

4. In an arrangement according to claim 3 wherein:
   said overlap covers about half of each said first and said second temperature ranges.

5. An arrangement according to claim 2 wherein: both said top and front shutter means comprise a series of air foil shaped louver blades on horizontal axes, said blades being in imbricated relation with said shutters in closed positions.

6. An arrangement according to claim 5 wherein:
   the upper surface of the blades of said top shutter means face forwardly upon opening of said top shutter means;
   the front surfaces of the blades of said front shutter means face upwardly upon opening of said upper shutter means.

7. An arrangement according to claim 2 wherein:
   said cabinet includes internal partition means forming a part of a recirculation passage from a first location adjacent the space below the front part of said top shutter means to a second location adjacent the space behind the upper part of said front shutter means;
   said temperature responsive means is located in said passage; and
   said front shutter means in a full open position materially obstructs said recirculation passage.

* * * * *